UNITED STATES PATENT OFFICE 2,050,199

ACCELERATOR OF VULCANIZATION

Lorin B. Sebrell, Silver Lake, Ohio, assignor, by mesne assignments, to Wingfoot Corporation, Wilmington, Del., a corporation of Delaware No Drawing. Application June 8, 1934, Serial No. 729,697. In Canada November 5, 1932

17 Claims. (Cl. 18—53)

My invention relates to a class of compounds, new in and of themselves, which have been found to be excellent accelerators of the vulcanization of rubber. More particularly it concerns that class of accelerators known as substituted ammonium salts of mercapto thiazoles. I have discovered a new class of these salts; namely the alicyclic ammonium thiazyl sulphides, which may also be called cyclo paraffinic hydrocarbon ammonium thiazyl sulphides or saturated isocyclic ammonium thiazyl sulphides. These compounds may be prepared by the simple expedient of refluxing substantially molar quantities of the desired alicyclic amine with a suspension of the desired mercapto thiazole in an inert solvent for a suitable period, generally about an hour. These materials may also be prepared by simply bringing together the reactants in an inert solvent at normal room temperatures.

The following are illustrative examples of mercapto thiazoles which may be employed: 2-mercaptobenzothiazole, 2-mercapto 4-phenyl thiazole, 6-methyl mercaptobenzothiazole, 5- or 6-chloro mercaptobenzothiazole, 6-amino mercaptobenzothiazole, 5- or 6-nitro mercaptobenzothiazole, 5-chlor 6-nitro mercaptobenzothiazole, 4-methyl mercaptobenzothiazole, 2-mercapto naphtho thiazole, 2-mercapto 4-phenyl benzothiazole, 2-mercaptothiazole, 2-mercapto 4-methyl thiazole, 2-mercapto xylyl thiazole, 2-mercapto 5-methoxy benzothiazole, 2-mercapto 5-ethoxy benzothiazole, and other halogen-, nitro-, hydroxy-, alkoxy-, and amino-substituted arylene mercapto thiazoles.

Examples of alicyclic amines reactive with the mercapto thiazoles hereinbefore set forth are the primary alicyclic amines such as cyclohexyl amine, ortho methyl cyclohexyl amine, p-methyl cyclohexyl amine, hexahydro xylidine, 4-phenyl 1-amino cyclo hexane, p-ethoxy cyclohexyl amine, o-ethoxy cyclohexyl amine, m-methoxy cyclohexyl amine, o-methoxy clyclohexyl amine, p-methoxy cyclohexyl amine, hexahydro p-amino dimethyl aniline and 1-amino 4-hydroxy cyclo hexane. Others are alicyclic tetra hydro beta naphthylamine, alicyclic tetra hydro alpha naphthylamine, aryl tetra hydro beta naphthylamine, aryl tetra hydro alpha naphthylamine, the decahydro naphthylamines, bornyl amine, caryl amine, etc. Examples of secondary alicyclic amines which will react with the mercaptothiazoles are methyl cyclohexyl amine, ethyl cyclohexyl amine, dicyclohexyl amine, benzyl cyclohexyl amine, cyclohexyl aniline, N-methyl tetra hydro alpha or beta naphthylamine, N-ethyl beta decahydro naphthylamine, cyclohexyl isopropyl amine, cyclohexyl butyl amine, and the like. Tertiary amines such as tricyclohexyl amine may also be employed but it will usually be found rather difficult to isolate the reaction product.

In the reaction of these alicyclic amines with the mercaptothiazoles, the nitrogen atom of the amino group is apparently added directly to the sulphur in the mercapto group. For example, the reaction of ethyl cyclohexyl amine with mercaptobenzothiazole is believed to be represented thus:

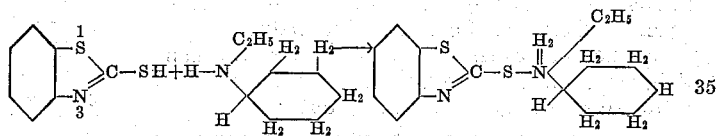

That between methyl cyclohexyl amine and 6-amino mercaptobenzothiazole may be expressed as follows:

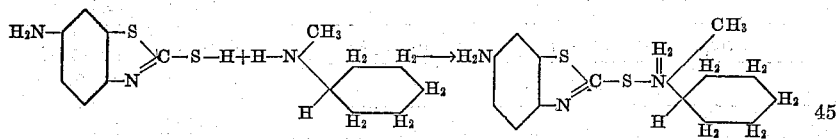

That between cyclohexyl amine and mercaptobenzothiazole may be expressed as follows:

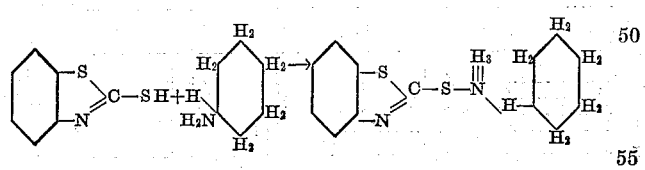

The compounds in question may be prepared by the refluxing of the amine in a suspension of the mercapto aromatic thiazole in an inert solvent. The crude products, although of high purity, may be further purified by recrystallization from alcohol. As a specific illustration, ethyl cyclohexyl ammonium benzothiazyl mono sulphide is prepared by refluxing 1 mol of ethyl cyclohexyl amine with a suspension of 1 mol of mercaptobenzothiazole in high test gasoline for a period of one hour. The resulting product when recrystallized from alcohol has a melting point of 133 degrees C. and an analysis of nitrogen 8.95% and sulphur 22.05%. The calculated theoretical analysis for ethyl cyclohexyl ammonium benzothiazyl mono sulphide is nitrogen 9.52% and sulphur 21.78%.

Dicyclohexyl ammonium benzothiazyl mono sulphide is prepared similarly and is a crystalline compound having a melting point of 172 degrees C. and an analysis of nitrogen 7.83% and sulphur 18.65%. The calculated values for the percentages of nitrogen and sulphur in dicyclohexyl ammonium benzothiazyl mono sulphide are 8.05 and 18.39 respectively.

In the case of cyclohexyl ammonium benzothiazyl mono sulphide approximately 1 mol of cyclohexyl amine is added to an alcoholic solution of 1 mol of mercaptobenzothiazole at normal room temperature. The product separates as white crystals having a melting point of 155–157 degrees C.

Although the compounds may be employed in most of the standard rubber formulae, the following is an example of one in which they have been found to be effective as accelerators:

|  | Parts |
| --- | --- |
| Rubber | 100.00 |
| Zinc oxide | 5.00 |
| Sulphur | 3.00 |
| Stearic acid | 1.50 |
| Accelerator | 0.50 |

To test the value of these new materials as accelerators, two sets of samples prepared in accordance with the above formula were subjected to vulcanization for varying periods of time. One set of samples was tested for elasticity and tensile strength immediately, while the other set was weighed, aged in an oxygen bomb for six days at a temperature of 50 degrees C. and at a pressure of 150 pounds per square inch, and reweighed in order to ascertain the increase in weight due to absorption of oxygen prior to its testing for elasticity and tensile strength. The results of these tests are shown by the following data:

| Time of cure in mins. at 260° F. | Load in kgs/cm² at | | | Percent elong. at break | Percent weight increase |
| --- | --- | --- | --- | --- | --- |
| | 500% elong. | 700% elong. | Break | | |

*Dicyclohexyl ammonium benzothiazyl mono sulphide*

*Original*

| 10 | 9 | 22 | 64 | 900 | |
| 15 | 16 | 50 | 131 | 850 | |
| 25 | 21 | 97 | 135 | 795 | |
| 40 | 33 | 132 | 159 | 730 | |

*Aged in oxygen bomb*

| 10 | 15 | 46 | 101 | 835 | .35 |
| 15 | 19 | 63 | 114 | 800 | .32 |
| 25 | 22 | 80 | 116 | 760 | .31 |
| 40 | 29 | | 69 | 635 | 2.22 |

*Ethyl cyclohexyl ammonium benzothiazyl mono sulphide*

*Original*

| 3 | 9 | 22 | 44 | 820 | |
| 5 | 11 | 32 | 103 | 910 | |
| 10 | 24 | 80 | 100 | 740 | |
| 15 | 26 | 110 | 176 | 780 | |

*Aged in oxygen bomb*

| 3 | 14 | 49 | 108 | 830 | .33 |
| 5 | 18 | 65 | 104 | 780 | .30 |
| 10 | 25 | 97 | 160 | 785 | .30 |
| 15 | 27 | 115 | 148 | 740 | .27 |

*Cyclohexyl ammonium benzothiazyl mono sulphide*

*Original*

| 20 | 43 | 188 | 196 | 705 | |
| 40 | 57 | | 210 | 680 | |
| 80 | 58 | | 216 | 685 | |
| 60/285° | 45 | | 152 | 685 | |

From this it will be seen that the compounds are powerful accelerators of vulcanization, giving rubber articles of increased tensile strength and elasticity. It is also noted that they give rubber stocks with excellent ageing qualities. Further they are substantially non-toxic, may be readily incorporated in rubber and are quite simply prepared. It is apparent that a new group of highly valuable compounds has been discovered.

This application is in part a continuation of application Serial No. 596,145, filed March 1, 1932.

It will be understood that the details of the invention may be varied within comparatively wide limits without departing from the inventive concept and that it is therefore desired to embrace within the scope of the invention such modifications and changes as may be necessary to adapt it to varying conditions and uses. It is intended that the patent shall cover, by suitable expression in the appended claims, whatever features of patentable novelty reside in the invention.

What I claim is:

1. The process of treating rubber which comprises subjecting it to vulcanization in the presence of N-cyclohexyl ammonium benzothiazyl mono sulphide.

2. The process of treating rubber which comprises subjecting it to vulcanization in the presence of an N-cyclohexyl ammonium benzothiazyl mono sulphide.

3. The process of treating rubber which comprises subjecting it to vulcanization in the presence of an N-cyclohexyl ammonium benzothiazyl sulphide.

4. The process of treating rubber which comprises subjecting it to vulcanization in the presence of a primary alicyclic ammonium benzothiazyl mono sulphide.

5. The process of treating rubber which comprises subjecting it to vulcanization in the presence of an alicyclic ammonium benzothiazyl mono sulphide.

6. The process of treating rubber which comprises subjecting it to vulcanization in the presence of an alicyclic ammonium aromatic thiazyl sulphide.

7. The process of treating rubber which comprises subjecting it to vulcanization in the presence of a primary alicyclic ammonium aromatic thiazyl mono sulphide.

8. The process of treating rubber which comprises subjecting it to vulcanization in the presence of an N-cyclohexyl ammonium aromatic thiazyl mono sulphide.

9. The process of treating rubber which comprises subjecting it to vulcanization in the presence of N-cyclohexyl ammonium aromatic thiazyl mono sulphide.

10. The process of treating rubber which comprises subjecting it to vulcanization in the presence of an ammonia addition product of a mercapto aromatic thiazole, the ammonia additament being substituted by at least one radical containing an alicyclic group.

11. The process of treating rubber which comprises subjecting it to vulcanization in the presence of a cycloparaffinic hydrocarbon ammonium thiazyl sulphide.

12. The process of treating rubber which comprises subjecting it to vulcanization in the presence of an ammonium benzothiazyl sulphide, the ammonium group being substituted by a cyclic group containing at least one alicyclic group.

13. The process for treating rubber which comprises subjecting it to vulcanization in the presence of a primary cyclohexyl ammonium benzothiazyl sulphide.

14. A rubber product which has been vulcanized in the presence of N-cyclohexyl ammonium benzothiazyl sulphide.

15. A rubber product which has been vulcanized in the presence of a primary cyclohexyl ammonium benzothiazyl mono sulphide.

16. A rubber product which has been vulcanized in the presence of a primary alicycic ammonium aromatic thiazyl sulphide.

17. A rubber product which has been vulcanized in the presence of an alicyclic ammonium aromatic thiazyl sulphide.

LORIN B. SEBRELL.